United States Patent [19]

Lockhart et al.

[11] Patent Number: 5,219,475
[45] Date of Patent: Jun. 15, 1993

[54] AQUEOUS GELLABLE COMPOSITION, USEFUL FOR MODIFYING THE PERMEABILITY OF A PETROLEUM RESERVOIR

[75] Inventors: Thomas P. Lockhart; Paola Albonico, both of Milan, Italy

[73] Assignees: Eniricerche S.p.A.; AGIP S.p.A., both of Milan, Italy

[21] Appl. No.: 853,815

[22] Filed: Mar. 19, 1992

[30] Foreign Application Priority Data

Mar. 28, 1991 [IT] Italy .................. MI91 A/000857

[51] Int. Cl.$^5$ ............................................. E21B 43/25
[52] U.S. Cl. .................. 252/8.551; 523/130; 166/295; 525/360
[58] Field of Search .................. 252/8.551; 523/130; 166/295; 525/360

[56] References Cited

U.S. PATENT DOCUMENTS

| | | | |
|---|---|---|---|
| 3,267,083 | 8/1966 | Imhof | 525/360 X |
| 3,536,137 | 10/1970 | Walther | 166/295 |
| 3,867,354 | 2/1975 | Betts et al. | 260/78.4 EP |
| 3,950,313 | 4/1976 | Bain et al. | 260/79.5 C |
| 4,373,070 | 2/1983 | Soula | 525/360 X |

FOREIGN PATENT DOCUMENTS

| | | |
|---|---|---|
| 0170893 | 2/1986 | European Pat. Off. |
| 0326720 | 8/1989 | European Pat. Off. |
| 0390137 | 10/1990 | European Pat. Off. |
| 0390279 | 10/1990 | European Pat. Off. |

*Primary Examiner*—Gary L. Geist
*Attorney, Agent, or Firm*—Oblon, Spivak, McClelland, Maier & Neustadt

[57] ABSTRACT

An aqueous gellable composition having a delayed gelling time is disclosed, which contains a water-soluble polymer crosslinkable with $Cr^{3+}$ and a crosslinking/retardant system containing a $Cr^{3+}$ ion and a salicylic acid ligand, wherein said ligand can be in free form, or in the form of a complex with $Cr^{3+}$, or partially in free form and partially in complexed form.

Such a composition is useful for modifying the permeability in petroleum reservoirs, within a wide range of temperatures, of from about 60° C. to 120° C., or higher temperatures.

16 Claims, No Drawings

AQUEOUS GELLABLE COMPOSITION, USEFUL FOR MODIFYING THE PERMEABILITY OF A PETROLEUM RESERVOIR

The present invention relates to an aqueous gellable composition, with delayed gelling time, useful for modifying the permeability of high-permeability regions in petroleum reservoirs, in particular in high-temperature reservoirs.

The invention relates also to a process for reducing the permeability of a reservoir, which process uses said gellable composition.

It is well-known that at the end of the primary step of recovery of petroleum from a petroleum reservoir, in which step the recovery occurs thanks to the natural energy stored in the petroleum reservoir, or with the use of mechanical energy, inside the reservoir still a large amount of petroleum remains. Therefore, in order to increase the amount of petroleum which can be extracted, techniques of secondary recovery are customarily used, which essentially consist in injecting into the reservoir a fluid, generally water or a polymeric solution, or a gas, such as carbon dioxide or steam, which conveys petroleum to the production well.

However, owing to the heterogeneity of the petroleum bearing rock, which is constituted by regions with different permeability, such fluids tend to preferentially flow through the higher-permeability regions. The low-permeability regions remain hence non-fluxed, or only partially fluxed, and this matter of fact prevents the extraction of the therein contained petroleum.

A proposed solution to solve such a problem consists in modifying the permeability of the reservoir by either completely or partially occluding the high-permeability regions, so that the flow of the liquid subsequently injected into the reservoir for the recovery of petroleum can be diverted towards the low-permeability regions.

One among the techniques most widely used for that purpose is based on the injection, into the reservoir, of an aqueous solution of a gellable polymer, which can be gelled by means of a multivalent metal ion, and the generation in situ of polymeric gels.

Since the regions which one wants to occlude may be very large and/or may be at a long distance from the injection well, it is necessary that the formation of the gel takes place with a delay, so as to enable the gellable solution to reach the desired region and fill it to a complete, or substantially complete, extent.

In particular, the use is known in the art, of gellable compositions having delayed gelling time, which compositions generally consist of a polymer which can be crosslinked by means of a multivalent metal ion, e.g., polyacrylamide, a multivalent metal ion crosslinkg agent and a ligand or sequestering agent for said multivalent metal ion.

So, e.g., in UK patent application 2,187,773, a gellable composition having a delayed gelling time is disclosed, which contains a water-soluble polymer, a crosslinking agent constituted by a complex of $Cr^{3+}$ with a carboxylate ion, in particular acetate ion, and a delaying agent selected from among the carboxy acids, preferably from among the aliphatic monocarboxy acids, in particular acetic acid.

Such a system shows the advantage that a low-cost ligand, such as acetic acid, is used, but in case of high-temperature reservoirs, the delay in gelling rate which can be obtained is at all insufficient in order to perform the occlusion of large regions and/or regions situated far away from the injection well.

In European patent applications EP 390282 and EP 390279, the use is disclosed of compositions which can be gelled by means of $Cr^{3+}$, containing as the retardant agent and organic ligand selected from among the aliphatic and aromatic dicarboxy acids, or the α-hydroxyacids or α-aminoacids.

Unfortunately, such compositions did not prove to be satisfactory under all viewpoints; in particular, the proposed ligands are mostly expensive, rendering the process of modification of permeability a burdensome one.

The present Applicant has found now a new aqueous gellable composition having a delayed gelling time, which makes it possible the drawbacks which effect the prior art, as above briefly mentioned, to be overcome.

Therefore, a purpose of the present invention is said aqueous gellable composition with delayed gelling time.

In accordance therewith, according to the present invention, said aqueous gellable composition comprises:

(a) a water-soluble organic polymer crosslinkable with $Cr^{3+}$;

(b) a crosslinking/retardant system containing a $Cr^{3+}$ ion and a salicylic acid ligand, wherein said ligand can be in free form, or in the form of a complex with $Cr^{3+}$ ion, or partially in free form and partially in complexed form.

The water-soluble organic polymers which can be crosslinked by using $Cr^{3+}$, useful according to the purposes of the present invention, are generally selected from the group consisting of acrylamide polymers. In particular, there can be used either acrylamide homopolymers, or acrylamide copolymers with one or more copolymerisable unsaturated monomer(s), such as, e.g., acrylic acid, methacrylamide, sodium 2-acrylamido-2methyl-propane-sulfonate and N-vinyl-2-pyrrolidone. Among the copolymers, the copolymers of acrylamide with sodium 2-acrylamido-2-methyl-propane-sulfonate, the copolymers of acrylamide with N-vinyl-pyrrolidone and the terpolymers of acrylamide with sodium 2-acrylamido-2-methyl-propane-sulfonate and N-vinyl-2-pyrrolidone are preferably used.

Said acrylamide homopolymers and copolymers can be either substantially non-hydrolysed (less than 1% of amidic groups hydrolysed into free carboxy groups), or partially hydrolysed (more than 1% of amidic groups hydrolysed into free carboxy groups). The molecular weight of these acrylamide polymers may generally be comprised within the range of from 100,000 to 20,000,000, and, preferably, within the range of from 200,000 to 12,000,000.

The concentration of the water-soluble organic polymer in the gellable composition according to the present invention can generally range from 1,000 to 80,000 ppm, and preferably is comprised within the range of from 3,000 to 50,000 ppm and, in most preferred form of practical embodiment, is comprised within the range of from 5,000 to 10,000 ppm when fresh water is used, and of from 10,000 to 30,000 ppm when salt water is used (such as, e.g., sea water).

The ligand of $Cr^{3+}$ ion contained in the crosslinking/retardant system according to the present invention is salicylic acid.

Said ligand can be present in the crosslinking/retardant system in free form, as the acid, or in the form of a complex with $Cr^{3+}$ ion, or partially in free form and partially in complexed form.

According to the preferred form of practical embodiment of the present invention, said ligand is present partially in free form and partially in the form of a complex with $Cr^{3+}$, because in that way the best results are obtained as regards the gelling rate, in particular at high temperatures, i.e., temperatures equal to, or higher than, 90° C.

In practice, in said preferred form of practical embodiment, the crosslinking/retardant system is constituted by a complex of $Cr^{3+}$ with salicylate ions, in which the molar ratio of salicylate:$Cr_{3-}$ can be comprised within the range of from 1:1 to 3:1, and preferably is 3:1, and salicylic acid, or a soluble salt thereof, in free form, i.e., not bonded in said complex.

The crosslinking/retardant system according to the present invention can additionally contain one or more hydroxy ions and/or neutral molecules, e.g., water, and other monovalent or divalent inorganic ions suitable for balancing the charge of the same system.

In those forms of practical embodiment of the invention in which the the crosslinking/retardant system contains an amount of ligand in free form, the molar ratio of said salicylic acid ligand in free form to $Cr^{3+}$ ion can be comprised within the range of from 1:1 to 50:1, and is preferably comprised within the range of from 3:1 to 10:1.

Such a molar ratio is selected as a function of the extent of the delay in gelling time which one wishes to attain, also on considering the temperature of the region of the reservoir, which one wishes to occlude.

The concentration of $Cr_{3+}$ ion in the gellable composition can be comprised within the range of from 10 to 5,000 ppm, and preferably is comprised within the range of from 25 to 800 ppm, with most preferred values being of from 100 to 600 ppm.

The gellable composition of the present invention can additionally contain one or more stabilizer agent(s) for the polymer, as customarily used, e.g., thiourea.

The pH value of the gellable composition according to the present invention can be comprised within the range of from about 2 to about 9, and preferably is of from 4 to 7. Therefore, when either mecessary or desired, the pH value of the composition is adjusted by means of the addition of a mineral acid or base, e.g., hydrochlorid acid, or sodium hydroxide.

The aqueous gellable composition according to the present invention can be prepared by simply blending its components in water, and advantageously aqueous solutions of the same components are used; the sequence of addition of the components is not critic.

However, preferably, an aqueous solution is prepared first, which contains the polymer and the optional stabilizer agent, then an aqueous solution of salicylic acid ligand is added, in case one wishes to operate with a crosslinking/retardant system in which the ligand is totally or partially in non-complexed form, and an aqueous solution is finally added of a complex of $Cr^{3+}$ with salicylate, or an aqueous solution of an inorganic $Cr^{3+}$ salt, such as, e.g. nitrate or chloride, is added.

The salicylate complex of $Cr^{3+}$ can be prepared by using known procedures of inorganic chemistry. For example, it can be prepared by reacting chrome hydroxide $Cr(OH)_3$ with sodium salicylate, substantially following the procedure as reported in "Inorganic Syntheses", Vol. 16, pages 80–81.

Water used in the preparation of the gellable composition of the present invention can be free from salts, or it can contain salts and, advantageously, the same water contained in the same reservoir can be used.

A further purpose of the present invention is a process for reducing the permeability in a petroleum reservoir, which process uses the composition disclosed hereinabove.

More particularly, according to the present invention, said process comprises the following steps:
(a) preparing an aqueous gellable composition, as disclosed hereinabove;
(b) injecting said gellable composition into the petroleum reservoir through at least one well;
(c) causing said composition to flow through the reservoir, until it reaches and substantially fills the high-permeability region which has to be treated; and
(d) causing said composition to turn into a gel, with the permeability of the above said region being consequently decreased.

Such a composition is useful for modifying the permeability in a petroleum reservoir, within a wide range of temperatures, of from 60° C. up to 120° C., or once more.

Said composition advantageously enables the permeability of high-permeability regions situated deeply in the reservoir or anyway far away from the injection well to be reduced, without that an early gelling occurs.

In general, it was found that delays in gelling rate can be obtained, which can be as long as one week, when one operates at temperatures of the order of 90°–120° C.

The low cost of salicylic acid makes it also possible economic advantages to be attained additionally to the above benefits.

The following examples are to be considered as illustrative of the invention, and should not be construed as being limitative of the purview of the same invention.

EXAMPLE 1

An aqueous solution of a commercial copolymer of acrylamide and sodium 2-methyl-1-propane-sulfonate in a weight ratio of approximately 75:25, with about 4% of hydrolysed amidic groups, is prepared. To the solution of the copolymer, thiourea is added as the stabilizer agent.

An aqueous solution is prepared of $Cr(salicylate)_3$ complex, obtained as follows.

200 ml of an 1.7M solution of ammonium hydroxide is added, with stirring, to a solution of commercial $CrCl_3 \cdot 6H_2O$ (13.3 g; 0.05 mol) in 200 ml of water.

The so formed chrome oxide $Cr(OH)_3$ is centrifuged off and then is purified from any chlorine traces, by being repeatedly washed with water and centrifuged, as described in "Inorganic Syntheses", vol. 16, page 31.

To the so obtained $Cr(OH)_3$, 100 ml of a solution at 80° C. of sodium salicylate (24 g, 0.15 mol) is added, and the resulting solution is kept with stirring for about 2 hours, always at 80° C.

At the end, the solution is cooled and a solution of diluted hydrochloric acid is added, in order to adjust the pH value at 3.

The $Cr(salicylate)_3$ complex precipitates off and then is filtered off and washed with a solution of diluted hydrochloric acid at pH 3.

The elemental analysis of the obtained product demonstrates that the ratio of chrome:carbon by weight is of 0.21 (theoretical value: 0.20).

Then, samples of gellable composition are prepared by mixing, inside a test tube with screw-threaded cap, the solution of the copolymer and of the stabilizing agent, with solutions containing different concentrations of salicylic acid, and subsequently adding the aqueous solution of Cr(salicylate)₃ complex.

All samples so prepared contain 5000 ppm of copolymer, 5000 ppm of thiourea, 200 ppm of $Cr^{3+}$ and concentrations of non-complexed salicylic acid respectively of 0.008M (molar ratio of salicylic acid:$Cr^{3+}$ =2.1), 0.024M (molar ratio of salicylic acid:$Cr^{3+}$ =6:1) and 0.040M (molar ratio of salicylic acid:$Cr^{3+}$ =10:1).

The pH value is adjusted at 5±0.1 by means of the addition of sodium hydroxide or hydrochloric acid.

The so prepared samples are finally charged to an oil bath at 120° C. for 15 minutes, and then to an oven at the same temperature.

The gelling times of the several samples are reported in Table 1.

TABLE 1

| Molar ratio[a] of salicylic acid/Cr(3+) | Gelling time (hours) |
|---|---|
| 2:1 | 30 ÷ 46 |
| 6:1 | 53 ÷ 118 |
| 10:1 | 150 ÷ 165 |

[a]The molar ratio relates to the salicylic acid which is not in the complexed form.

EXAMPLE 2

Example 1 is repeated using sea water for preparing the aqueous gellable compositions.

All samples prepared contain 5000 ppm of copolymer, 5000 ppm of thiourea, 200 ppm of $Cr^{3+}$ [as Cr(salicylate)₃] and concentrations of non-complexed salicylic acid, respectively of 0.008M (molar ratio of salicylic acid:$Cr^{3+}$ =2.1), 0.024M (molar ratio of salicylic acid:$Cr^{3+}$ =6:1) and 0.040M (molar ratio of salicylic acid:$Cr^{3+}$ =10:1).

The sample gelling times at 120° C. are reported in following table 2.

TABLE 2

| Molar ratio[a] of salicylic acid/Cr(3+) | Gelling time (hours) |
|---|---|
| 2:1 | 5 ÷ 21.5 |
| 6:1 | 57 ÷ 117 |
| 10:1 | 140 |

[a]The molar ratio relates to the salicylic acid which is not in the complexed form.

EXAMPLE 3

By operating as in Example 1, an aqueous gellable composition is prepared, which contains 5000 ppm of copolymer of Example 1, 5000 ppm of thiourea and 200 ppm of $Cr^{3+}$ supplied as Cr(salicylate)₃. Furthermore, two gellable compositions are prepared, which contain, besides Cr(salicylate)₃ complex, also salicylic acid in non-complexed form, in a molar ratio of salicylic acid to $Cr^{3+}$ respectively of 2:1 and 6:1. The gelling times of the different compositions, at the temperature of 90° C., are reported in following Table 3.

TABLE 3

| Molar ratio[a] of salicylic acid/Cr(3+) | Gelling time (hours) |
|---|---|
| — | 12–15[a] |
| 2:1 | 22–46 |
| 6:1 | 166–190 |

[a]This gelling time relates to the gellable composition only containing Cr(salicylate)₃.

We claim:

1. A gellable aqueous composition having a delayed gelling time, comprising:
   (a) 1,000–50,000 ppm of said gellable composition of an aqueous water-soluble polymer crosslinkable with $Cr^{3+}$ ions, said polymer being selected from the group consisting of homopolymers of acrylamide and copolymers of acrylamide with one or more copolymerizable unsaturated monomers, said polymer having a molecular weight of from 100,000 to 20,000,000; and
   (b) a crosslinking and gel-retarding system containing 10–5,000 ppm of said gellable composition of $Cr^{3+}$ ions and a salicylic acid ligand, wherein the molar ratio of salicylic acid ligand to $Cr^{3+}$ ions is from 1:1 to 50:1 and wherein said salicylic acid ligand is in free form or in the form of a complex with said $Cr^{3+}$ ions or a mixture thereof.

2. The composition of claim 1, wherein said molar ratio is in the range from 3:1 to 10:1.

3. The composition of claim 1, wherein said aqueous composition comprises fresh water and the concentration of said water-soluble organic polymer in said gellable composition is from 3,000 to 50,000 ppm.

4. The composition of claim 1, wherein said aqueous composition comprises salt water and the concentration of said water-soluble organic polymer in said gellable composition is from 10,000 to 30,000 ppm.

5. The composition of claim 1, wherein the concentration of $Cr^{3+}$ ions in said gellable composition is from 25 to 800 ppm.

6. The composition of claim 1, wherein the concentration of $Cr^{3+}$ ions in said gellable composition is from 100 to 600 ppm.

7. The composition of claim 1, wherein said water-soluble organic polymer has less than 1% amide groups hydrolyzed to free carboxy groups.

8. The composition of claim 1, wherein said water-soluble organic polymer has more than 1% amide groups hydrolyzed to free carboxy groups.

9. The composition of claim 1, wherein said water-soluble organic polymer has a molecular weight in the range of from to 200,000 to 12,000,000.

10. The composition of claim 1, wherein said water-soluble polymer is a copolymer and said copolymerizable unsaturated monomer is selected from the group consisting of acrylic acid, methacrylamide, sodium 2-acrylamido-2-methyl-propane-sulfonate and N-vinyl-2-pyrrolidone.

11. The composition of claim 1, wherein said water-soluble organic polymer is selected from the group consisting of copolymers of acrylamide with sodium 2-acrylamido-2-methyl-propane-sulfonate, copolymers of acrylamide with N-vinyl-pyrrolidone and terpolymers of acrylamide, sodium 2-acrylamido-2-methyl-propane-sulfonate and N-vinyl-2-pyrrolidone.

12. The composition of claim 1, further comprising thiourea.

13. The composition of claim 1, wherein said composition has a pH of from about 2 to about 9.

14. The composition of claim 1, wherein said composition has a pH of from 4 to 7.

15. The composition of claim 1, wherein a portion of said salicylic acid ligand is in free form and a portion is in a form complexed with $Cr^{3+}$.

16. A process for reducing the permeability of a petroleum reservoir having a high permeability region, which comprises the steps of:

(a) preparing the aqueous gellable composition of claim 1;
(b) injecting said gellable composition into the petroleum reservoir through at least one well;
(c) flowing said composition through the reservoir until it reaches and substantially fills the high-permeability region; and
(d) gelling said composition, whereby the permeability of the high-permeability region is decreased.

* * * * *